United States Patent [19]
Suzuki et al.

[11] 3,945,614
[45] Mar. 23, 1976

[54] ICE CREAM FREEZER

[75] Inventors: Masahiko Suzuki, Hino; Takayuki Motomura, Machida; Kiyoshi Seko, Nagoya; Hiroshi Takahashi, Numazu, all of Japan

[73] Assignees: Snow Brand Milk Products Co., Ltd., Sapporo; Fuji Machinery Co., Ltd., Nagoya; Sanwa Machine Co., Inc., Numazu, all of Japan

[22] Filed: Mar. 15, 1974

[21] Appl. No.: 451,511

[30] Foreign Application Priority Data
Mar. 29, 1973 Japan.............................. 48-36033

[52] U.S. Cl................ 259/4 R; 222/144.5; 222/145
[51] Int. Cl.² ......................................... B01F 15/02

[58] Field of Search ... 259/4, 36, DIG. 32, DIG. 34; 222/144.5, 145, 193, 571

[56] References Cited
UNITED STATES PATENTS
| | | | |
|---|---|---|---|
| 1,642,623 | 9/1927 | Niven............................... | 222/144.5 |
| 3,460,717 | 8/1969 | Thomas........................... | 222/144.5 |

*Primary Examiner*—Robert W. Jenkins

[57] ABSTRACT

An ice cream freezer has a sauce supplying means arranged near an ice cream forcing-out nozzle, the sauce fed by the supplying means being applyed to the ice cream to be forced out from the nozzle, thereby forcing out the ice cream with the desired sauce from the nozzle.

4 Claims, 4 Drawing Figures

U.S. Patent  March 23, 1976  Sheet 1 of 2  3,945,614
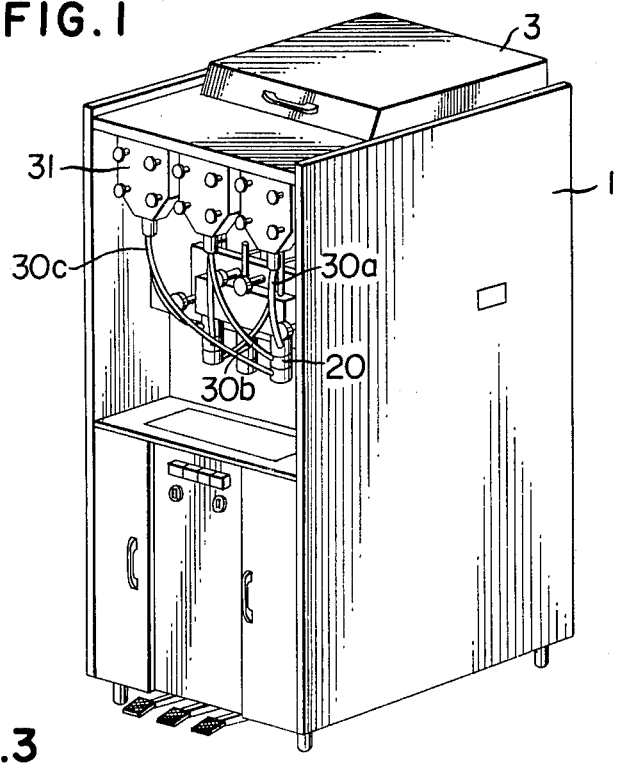
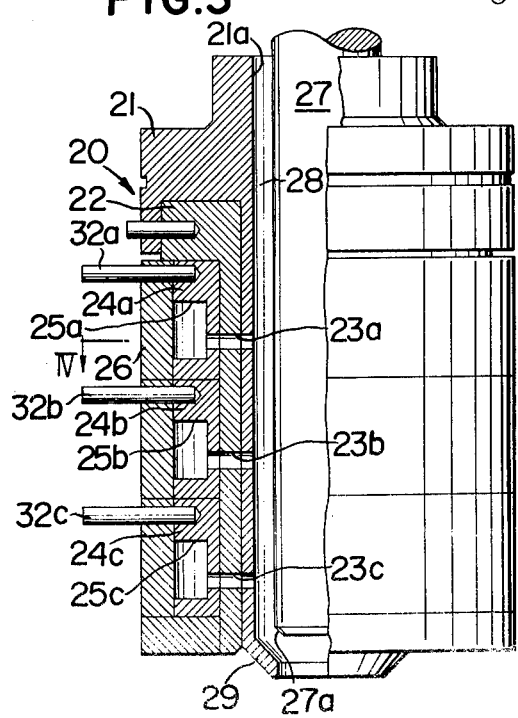
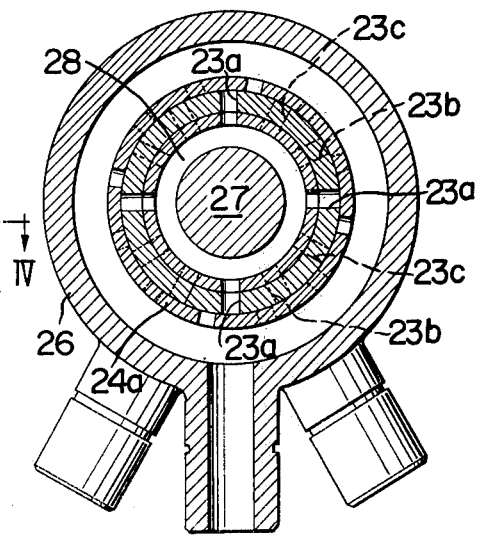

ICE CREAM FREEZER

The present invention relates to an ice cream freezer for a soft and hard ice cream, particularly to an ice cream freezer able to supply a sauce such as a chocolate, a jam and the like on an ice cream to be forced out from a nozzle of the freezer.

Hitherto, in an ice cream freezer which is located and used at a store, it has not been possible to supply ice cream with a desired sauce automatically added when the ice cream is forced out from the freezer.

According to the present invention, there is provided an ice cream freezer comprises a nozzle for forcing out an ice cream and means for supplying a sauce into a clearance defined by a member defining said nozzle, said sauce being supplied on the ice cream in said clearance. Thus, the ice cream freezer according to the present invention may provide automatically the ice cream with the desired sauce.

It is, therefore, a primary object of the present invention to provide an ice cream freezer capable of dressing a sauce such as a chocolate, a jam and the like on the ice cream to be forced out from a nozzle of the freezer.

It is an another object of the present invention to provide an ice cream freezer able to be set easily in an ice cream store and operated easily by a non-experienced operator.

The other several features, objects and advantages of the invention will become apparent from the following detailed description of a preferred embodiment thereof, reference being made to the accompanying drawing, in which:

FIG. 1 is a perspective view of an ice cream freezer embodying this invention;

FIG. 3 is a vertically sectional view of a nozzle assembly used in this embodiment; and FIG. 4 is a sectional view taken along a line IV—IV in FIG. 3.

Figure 2:
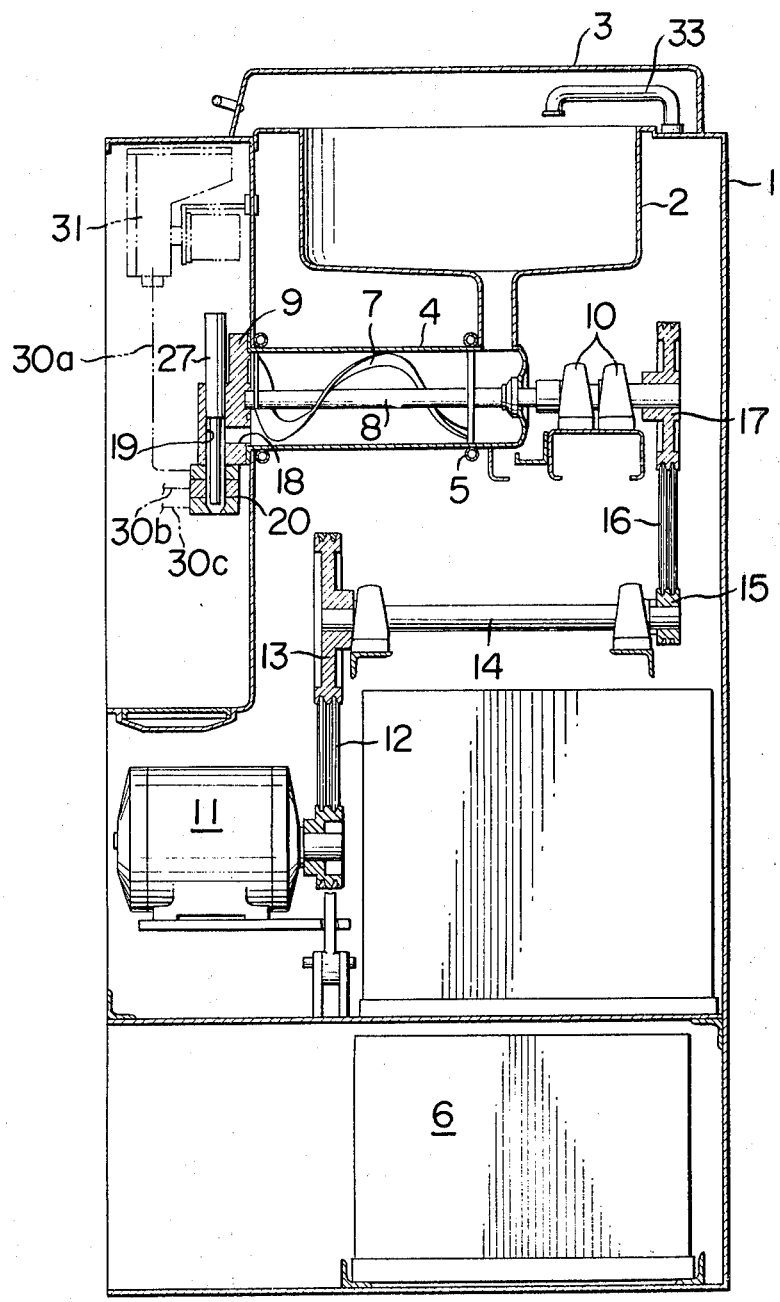
FIG. 2 is a vertically sectional view of a freezer embodying this invention.

Referring now to FIG. 2, an open mix tank 2 is located at the upper portion of a casing 1. The upward opened inlet of the tank 2 acts to receive a cream mix from a pipe 33 and is shielded with a cover 3 which may form a part of the top plate of the casing 1 so as to prevent the insertion of impurities in the air outside into the interior of the casing. A freezing box or freezer barrel 4 is provided below the mix tank 2 for receiving the cream mix supplied from said tank 2. In the embodiment of the present invention, a couple of mix tanks and freezer barrels are located in parallel so that different color-ice cream may be made individually or mixed. A heat exchanging pipe or barrel cooling pipe 5 is coiled around the barrel 4 and connected to a freezer or refrigerator 6 housed in the lower portion of the casing 1. A shaft 8 with a helical blade 7 for agitating the cream in the barrel passes through the barrel 4 and is rotatably supported outside of the barrel 4 by bearing assemblies 9, 10. The shaft 8 is rotated by a motor 11 through a belt 12, a pulley 13, an intermediate shaft 14, a pulley 15, a belt 16 and a pulley 17. The bearing assembly 9 is formed with an outlet 18 and a vertical passage 19 communicating therewith. A nozzle assembly 20 is provided at the lower portion of the vertical passage 19.

The nozzle assembly 20 has a body 21 having an axial bore 21a and a sleeve 22 fitted around the body 21. First nozzle holes 23a are made radially in both the body and the sleeve, further, second nozzle holes and third nozzle holes 23b, 23c are made radially in both the body and the sleeve. The second nozzle holes are drilled below the first nozzle holes and the third nozzle holes are drilled below the second nozzle holes. In this embodiment each hole of each nozzle holes 23a, 23b, 23c has been drilled at a right angle each other. For the purpose mentioned hereinafter, the nozzle holes 23a, 23b, 23c are made in the positions offset slightly in a vertical line, respectively. Annular valve bodies 24a, 24b, 24c are fitted rotatably around the external surface of the sleeve 22. The valve bodies 24a, 24b, 24c have on its exterior annular channels 25a, 25b, 25c and these channels are shielded with covers 26, respectively. 32a, 32b, 32c indicate handles for operating the valve bodies 24a, 24b, 24c.

The shaft hole 21a made in the main body 21 is so arranged as to be connected with the vertical passage 19 of the bearing assembly 9 and a valve stem 27 is axially slidably inserted into the passage 19 and the shaft hole 21a. As shown in the drawings, the valve stem 27 is inserted loosely into passage 19 and the shaft hole 21a to form a clearance between the inner walls of the holes 21a and the passage 19 of the bearing assembly 9 and the outer wall of the valve stem 27 so as to define a passage for the ice cream to be forced out. The valve stem 27 has at its extremity a beveled tip portion which meets with a conical valve seat 29 of the body 21. Thus, the ice cream-outlet port will be closed when the valve stem moves downward and the beveled portion of the valve stem meets with the valve seat 29. The channels 25a, 25b, 25c made in the valve bodies 24a, 24b, 24c are connected to sauce pumps 31 through hoses 30a, 30b, 30c.

When the ice cream freezer assembled according to the forgoing is operated, firstly the shaft 8 is rotated by actuating the motor while the refrigerator 6 is operated. With the rotation of the shaft 8, the ice cream in the barrel 4 is always agitated by the blade 7. The desirous one of the sauce supplying pumps 31 for a chocolate, a jam and the like is made actuated. The valve stem 27 is moved upward, simultaneously with the opening of the desirous one of the valve bodies 24a, 24b, 24c. While the ice cream is forced out through the passage 28, the desirous sauce is supplied on the external surface of the ice cream to make a stripped pattern on the ice cream surface. The forced out ice cream with the desirous sauce may be received in a usual corn cup. In this embodiment, as the nozzle holes 23a, 23b, 23c for the three kinds of sauces are made in the body 21 and the sleeve and the positions of the nozzle holes 23a, 23b, 23c are offset slightly in a vertical line, the freezer according to the present invention may apply the three kinds of sauces at the same time if desired.

The embodiment described above may selectively supply the three kinds of sauces on the ice cream because of the using of three valve bodies. However, it should be understood that the number of the valve bodies may be changed according to the kinds of sauces. According to the present invention the ice cream freezer may be provided which can make the ice cream with the chocolate, the jam and the like. Particularly, the present invention will be suitable to application of the freezer intended to be put in an ice cream store.

Although only a single embodiment has been shown and described, it will be appreciated that the description is for purpose of illustration only, without there being any intent to limit the scope of the invention except insofar as defined by the appended claims.

What we claim is:

1. An ice cream dispenser comprising: a nozzle for forcing out the ice cream, said nozzle comprising a cylindrical member and a valve stem inserted into said cylindrical member so as to leave an annular passage between said member and said valve stem for the ice cream, and means for supplying a sauce onto the ice cream being forced out through said nozzle, said sauce supplying means comprising at least one annular channel formed around said member, and a plurality of transverse nozzle holes connecting the respective annular channel with said passage.

2. An ice cream dispenser according to claim 1, which comprises a plurality of vertically spaced annular channels and wherein the nozzle holes of one annular channel are circumferentially offset with respect to the nozzle holes of another annular channel.

3. An ice cream dispenser according to claim 2, which comprises means for respectively establishing and interrupting the connection between the respective annular channel and said passage.

4. An ice cream dispenser according to claim 1, wherein said nozzle holes extend radially between the respective annular channel and said passage.

* * * * *